W. M. FULTON.
MEANS FOR ATTACHING HANDLES TO VALVE STEMS.
APPLICATION FILED DEC. 18, 1916.

1,340,604.

Patented May 18, 1920.

Inventor

Weston M. Fulton

By Mauro, Cameron, Lewis & Massie

Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

MEANS FOR ATTACHING HANDLES TO VALVE-STEMS.

1,340,604.     Specification of Letters Patent.     Patented May 18, 1920.

Application filed December 18, 1916. Serial No. 137,722.

*To all whom it may concern:*

Be it known that I, WESTON M. FULTON, a citizen of the United States of America, and a resident of Knoxville, Tennessee, have invented a new and useful Improvement in Means for Attaching Handles to Valve-Stems, which invention is fully set forth in the following specification.

This invention relates to the attachment of handles to parts to be operated and, while capable of use in a wide variety of constructions, has particular utility in the attachment of handles to valve stems.

An object of this invention is to provide handle-attaching means that is simple in construction, inexpensive to manufacture and readily assembled, and, where the handle is made of material easily broken or cracked, that minimizes the likelihood of injury to such handle during assemblage and contraction of component or attached parts, during subsequent use.

Stated briefly, the invention comprises, in combination with the member to be operated, as a valve-stem, said member being provided with one or more lateral projections constituting a head, a handle of any suitable material provided with a recess and with an aperture communicating with said recess, such aperture being so shaped as to admit said projection or projections to the recess, said projection or projections being then displaceable in said recess out of alinement with said aperture, preferably into interlocking relationship with the handle by further movement at an angle to the direction of said displacement. Means are provided for securing the handle and projection or projections on said member in said displaced relationship, said last-named means preferably comprising a device on said member for clamping the handle between said projection or projections and said device.

The invention is capable of receiving a variety of mechanical expressions, two of which are shown on the accompanying drawings, but it is to be expressly understood that the drawings are for purposes of illustration only, and are not to be construed as definitions of the limits of the invention, reference being had to the appended claims for that purpose.

Referring to the drawings.

Figure 1:
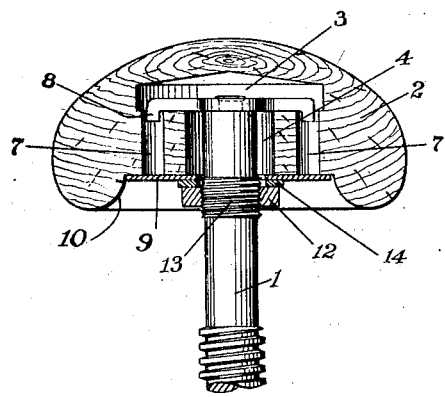
Figure 1 is a central vertical section through a handle embodying the present invention, and shows the stem and attaching means in position.

Referring in detail to the drawings, wherein the same reference characters designate corresponding parts in the several figures, 1 designates a stem, preferably a valve-stem, though obviously the same may be any suitable member to which it is desired to attach a handle. 2 designates the handle to be attached to said stem 1, the same being made of any suitable material, wood being illustrated.

Figure 2:
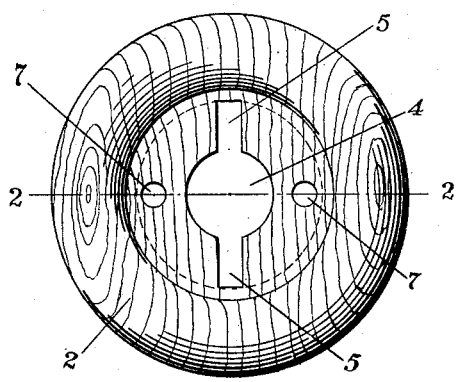
Fig. 2 is a bottom plan view of the handle.
Figure 3:
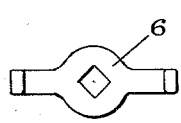
Fig. 3 is a plan view of a member for providing the projections on the stem.
Figure 6:
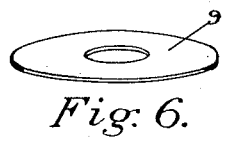
Fig. 6 is a perspective view of the clamping plate that may be used with either type of handle illustrated.

In the form shown in Figs. 1, 2 and 3, said handle 2 is provided with a recess 3 and with an aperture communicating with said recess. In the form shown, the aperture has a central portion 4 and at either side elongated extensions 5. The stem 1 is provided with means constituting a projection or projections so shaped as to pass through the aforesaid aperture into said recess. In the form shown, an elongated plate 6 is fixedly secured in any suitable way to the end of the stem, said plate 6 thereby constituting a T-head for the stem. Also communicating with the recess 3 in this form, and shown as extending to the exterior of the handle for convenience of construction, are two diametrically disposed depressions or apertures 7, so positioned as to receive lugs 8 formed on the arms of the T-head 6. Means are provided for securing the T-head 6 with the lugs 8 in interlocked relation with the apertures 7. To this end, loosely mounted on the stem 1 in the form shown is a clamping plate 9 of such diameter as to fit within the depressed portion 10 desirably provided on the lower face of the handle. Coacting with the plate 9 to secure the same in position is a nut 12, stem 1 being screw-threaded at 13 to receive said nut. If desired, a lock-washer 14 of any suitable construction may be interposed between the plate 9 and the nut 12 to retain the parts in operative position.

In assembling, stem 1 and handle 2 are positioned with the projections provided by the T-head 6 in alinement with the extensions 5 of the aperture communicating with the recess 3, and the head is then inserted freely into said recess. Stem 1 and handle 2 are thereupon relatively rotated, displacing said projections angularly within the recess and out of alinement with the extensions 5 of the aperture, to such a position that the lugs 8 on said head are in alinement with the apertures 7. The handle or the stem is then drawn outwardly in an axial direction until the head 6 bears on the wall of the recess with the lugs 8 projecting into the apertures 7. Plate 9 is then positioned against the outer surface of the handle, as in the bottom of the depressed portion 10, and nut 12, with the lock-washer 14 (if one is employed), is then set up firmly against the plate 9 on screw-thread 13, whereby handle 2, T-head 6 and plate 9 are fixedly clamped together.

The above construction enables the handle to be made of a unitary piece of material, and provides for rigidly securing the handle to the stem without the use of screws or other members entering into the material of the handle to crack or break the same.

Figure 4:
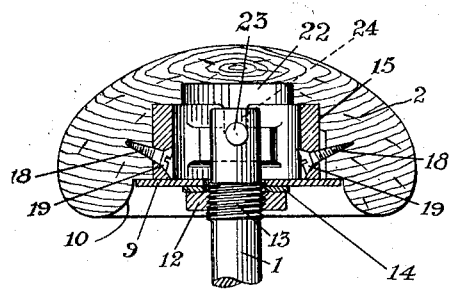
Fig. 4 is a central vertical section through another form of handle embodying the present invention, showing the stem and attaching means in position.
Figure 5:
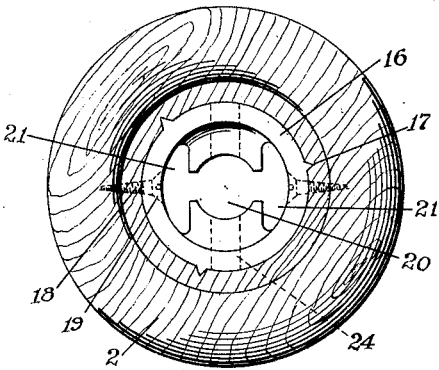
Fig. 5 is a bottom plan view of the latter form of handle.

If desired, however, the handle may be made in two sections, such a construction being shown in Figs. 4 and 5. In the form here shown, the handle 2 is bored, as at 15, to receive the apertured member 16 which may be retained in position by any suitable means, as by two or more screws 18 passing through openings 19 in said member. When wood or similar material is used for the handle, said member 16 may also be provided, as shown, with a plurality of small V-shaped ribs or projections 17 designed to bite into the material of the handle as said member is driven into position. Said member is provided with an aperture composed of a central portion 20 and opposed extensions 21 which, in the embodiment shown on the drawings, are T-shaped, to provide for the convenient insertion of the screws 18 through the apertures 19 which, for convenience of construction, may communicate with said extensions 21. The handle may be and is shown as bored beyond that portion designed to receive member 16, as shown at 22, so as to constitute a recess, said recess desirably being of smaller diameter than the exterior of said member 16. Aperture 20, 21 in said member in such case communicates with this recess 22. The stem 1 in the form here shown is provided adjacent its end with a transverse pin 23, preferably extending on either side thereof and constituting a T-shaped head therefor, said pin projecting on either side of the stem to a distance greater than the radial dimension of the central portion 20 of the aforesaid aperture, but to a distance no greater than the diameter of the extensions 21 of said aperture. To provide for the interlocking of the transverse pin 23 and the handle, when the pin is displaced within the recess out of alinement with the extensions 21 of the aperture, said member 16 on its inner edge may be provided with depressions 24, although said member and the head on the stem may be constructed, if desired, to provide an interlock of the type shown in Fig. 1. To clamp the handle and stem in their displaced relation, a clamping plate 9, nut 12 and, if desired, a lock-washer 14 may be employed as in the first described embodiment of the invention.

In assembling this modified handle, member 16 is driven into the boring 15 provided therefor, the V-shaped ribs or projections 17, when such are used, biting into the wood to prevent rotation of said member within the handle. The screws 18 are then inserted, through the opening 19, preferably at an inclination to the axis of said member as shown, and the member 16 thereby secured fixedly in position. The stem and handle are next so positioned that the transverse pin 23 is in alinement with the extensions 21 of the aperture in the member 16, and the head constituted by the projections is thereupon inserted into the recess 22. Then the handle and stem are relatively rotated, displacing said projections until the same come into alinement with the depressions 24 in the inner edge of member 16, whereupon said handle or stem is drawn outwardly in an axial direction, drawing said projections into said depressions. If the nut 12 be then tightened until the clamping plate 9 bears firmly on the outer edge of the member 16 or on the bottom of the depressed portion 10 of the handle, the handle is rigidly clamped between said transverse pin 23 and the clamping plate 9 with said pin in interlocked relation with the member 16. The clamping plate 9 also prevents the screws 18 when inclined to the axis of the stem, as shown, from working out of position.

While the illustrated embodiments of the present invention comprise two projections on the stem, it will be apparent that one or any desired number of projections may be employed by suitably shaping the aperture in the handle or in the member 16 so as to admit said projections to the recess for displacement therein. The term "head" is hereafter used to include any suitable number of projections, whether one or more.

The invention is not to be restricted to the forms illustrated as various other embodiments of this invention will readily suggest themselves to those skilled in the art. Therefore reference is to be had to the claims appended hereto for a definition of the limits of the invention.

What is claimed is:

1. In combination with a valve stem, a head on said stem, a handle provided with a recess and with an elongated aperture communicating with said recess and so shaped as to admit said head to said recess, said head being displaceable in said recess out of alinement with said aperture, means whereby said head and handle may be interlocked in said last-named position by movement at an angle to the direction of said displacement, and means on said stem to secure said head in said interlocked relation with said handle.

2. In combination with a valve stem, a head on said stem, a handle provided with a recess and with an elongated aperture communicating with said recess and so shaped as to admit said head to said recess, said head being displaceable in said recess out of alinement with said aperture, means whereby said head and handle may interlock by relative axial movement in said last-named position, and means on said stem to clamp said handle between said head in its displaced position and said clamping means.

3. In combination, a stem provided with a head, a handle provided with a recess and with an elongated aperture communicating with said recess and so shaped as to admit said head to said recess, said head being displaceable in said recess out of alinement with said aperture, one or more depressions in said recess into which said head may move axially when displaced out of alinement with said aperture, and means on said stem to secure said head interlocked in said depressions.

4. In combination, a stem provided with a head, a handle provided with a bore, a member inserted in said bore and providing a recess, said member having an elongated aperture communicating with said recess and so shaped as to admit said head to said recess, said head being displaceable in said recess out of alinement with said aperture, one or more depressions in said recess with which said head may engage when displaced, and means on said stem to secure said head interlocked in said depressions.

5. In combination, a stem provided with a head, a handle provided with a bore, a member inserted in said bore and providing a recess, said member having an elongated aperture communicating with said recess and so shaped as to admit said head to said recess, said head being displaceable in said recess out of alinement with said aperture, and means on said stem to clamp said handle between said head in its displaced position and said clamping means.

6. In combination, a stem provided with a head, a handle provided with a bore, a member inserted in said bore, one or more inclined screws for retaining said member in position, said member providing a recess and having an elongated aperture communicating with said recess and so shaped as to admit said head to said recess, said head being displaceable in said recess out of alinement with said aperture, and means on said stem comprising a clamping member for clamping said handle between said head and said member, said member being then positioned to oppose outward movement of said screws.

7. In combination, a stem provided with a head, a handle provided with a bore, a member inserted in said bore and forming therewith a recess, said member having an elongated aperture communicating with said recess and shaped to admit said head to said recess, said head being displaceable in said recess out of alinement with said aperture to prevent removal of said handle from said stem, and means on said stem to clamp said handle between said head and means in said position of displacement.

In testimony whereof I have signed this specification.

WESTON M. FULTON.